Sept. 13, 1927. 1,642,583
H. F. HANSON
HARROW GRINDER
Filed April 26, 1924 2 Sheets-Sheet 1
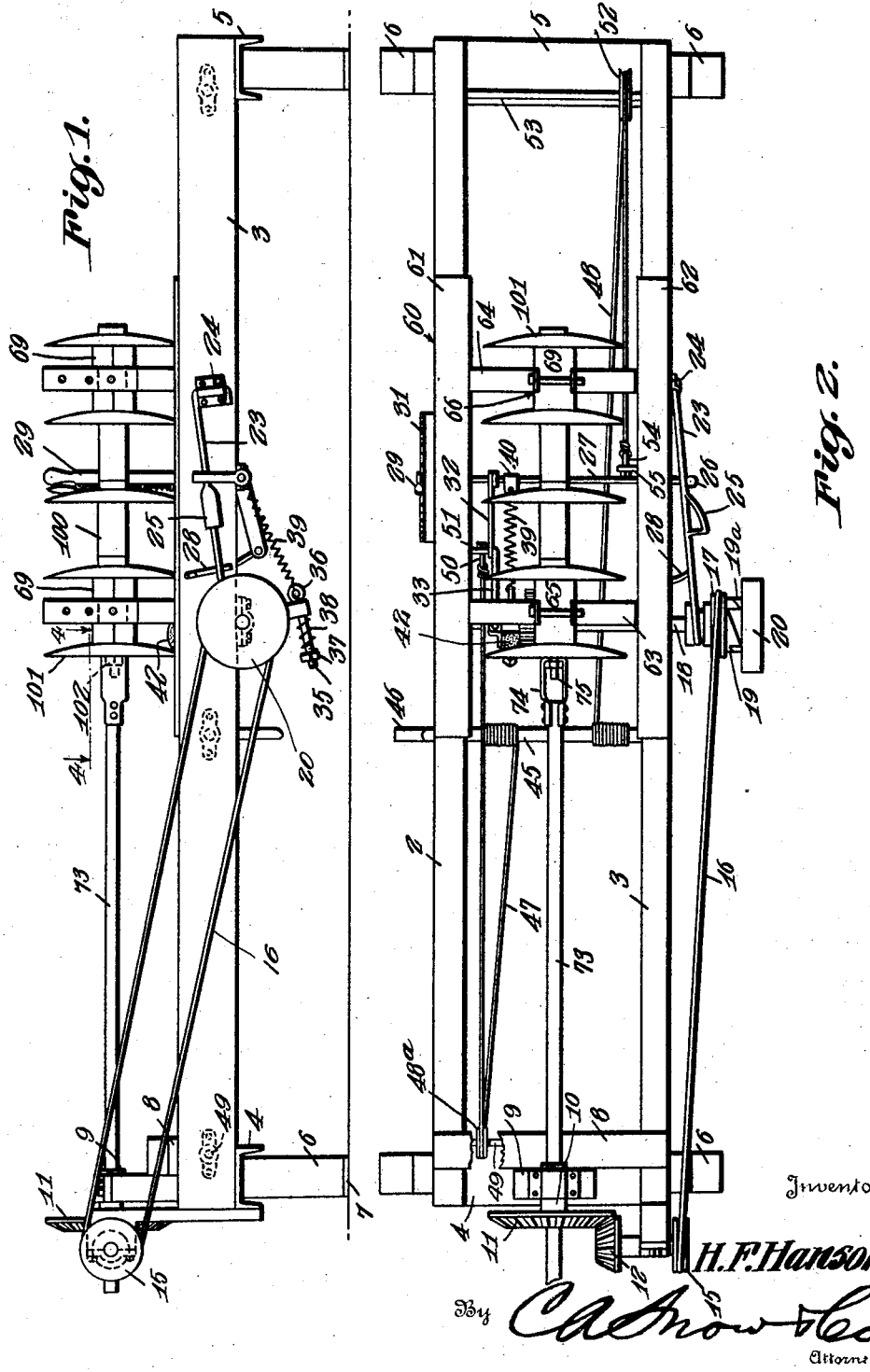

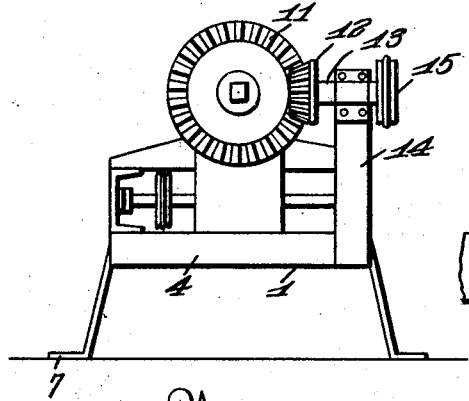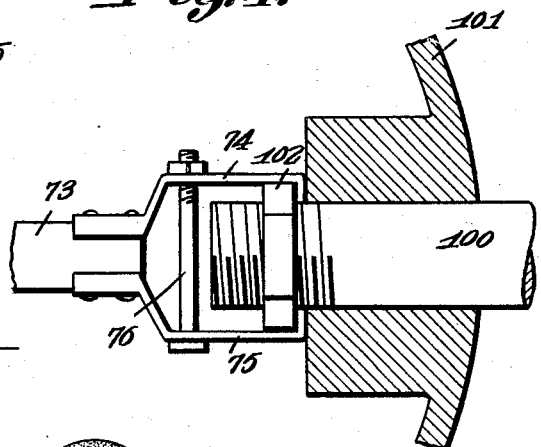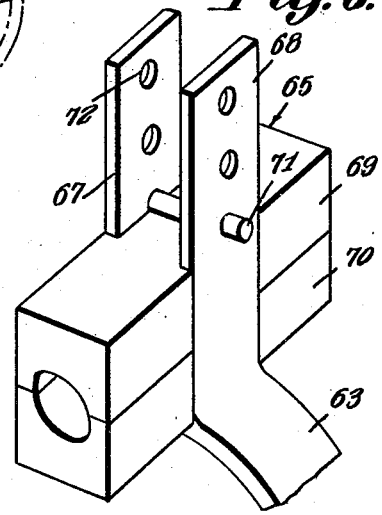

Patented Sept. 13, 1927.

1,642,583

UNITED STATES PATENT OFFICE.

HANS F. HANSON, OF INWOOD, IOWA.

HARROW GRINDER.

Application filed April 26, 1924. Serial No. 709,233.

This invention relates to a grinder for disk harrows.

The object of the invention is to provide a simple and efficient grinder of this character constructed so that the disks of the harrow may be sharpened without taking them apart and having an improved construction and arrangement of supporting and operating mechanism for the gang of disks to be sharpened.

With the foregoing and other objects in view, which appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a side elevation of a grinder constructed in accordance with this invention with a gang of harrow disks shown in position for grinding;

Fig. 2 is a top plan view thereof;

Fig 3. is an end elevation;

Fig. 4 is a detailed horizontal section taken on the line 4—4 of Fig. 1;

Fig. 5 is a detail side elevation with parts broken out and in section;

Fig. 6 is a detail perspective view of one of the bearings for the gang disk; and Fig. 7 is a detail horizontal section.

In the embodiment illustrated a supporting frame 1 is shown composed of longitudinally extending side bars 2 and 3 connected by end bars 4 and 5. This frame is shown supported by legs 6 located at the corners thereof preferably formed of metal and having outturned feet 7 which may be bolted or otherwise secured to a base.

The side and end bars are preferably constructed of channel iron and another end bar 8 connects the front portion of the side bars 2 and 3 being located in a plane in rear of bar 4 and which forms a support for a bearing 9 which may be of any suitable or desired construction and in which is rotatably mounted a hub 10 of a beveled gear 11. This hub is mounted for rotation in said bearing but is held against longitudinal movement by any suitable means.

The beveled gear 11 meshes with a beveled pinion 12 mounted on a stub shaft 13 journaled in a suitable bearing carried by a standard 14. This shaft 13 is provided at its outer end beyond the standard 14 with a pulley 15 which is connected by a belt 16 with another pulley 17 loose on a shaft 18 which extends transversely of the frame 1 about midway the length thereof. The pulley 17 has a clutch member 19 on its outer face designed to engage with a complementary clutch member 19ª carried by the inner face of a driving wheel or pulley 20 which is keyed to shaft 18 and adapted to be connected with any suitable source of power.

The pulley 17 has a peripherally grooved hub extension 21 on its inner face with which is designed to be engaged the hooked end 22 of a rod 23, the other end of which is mounted to swing laterally in a keeper 24 on the outer face of side bar 3. A cam 25 is carried by the rod 23 in the path of an arm 26 which projects at right angles from one end of a shaft 27 journaled to turn in suitable bearings carried by the side bars 2 and 3 of the frame and which is designed for a purpose presently to be described. A spring 28 is secured to the outer face of the side bar 3 and exerts its tension against rod 23 to normally force the rod outward together with the pulley 17 with which it is engaged and thereby hold the clutch members 19 and 19ª interlockingly engaged. This spring also operates to move this pulley outward after the arm 26 has been released from the cam 25 as will be hereinafter more fully described.

The end of shaft 27 opposite to the end carrying the arm 26 is equipped with a lever 29 which has a spring pressed dog 30 carried thereby designed to engage a toothed segment 31 secured to the outer face of side bar 2 by means of which the lever and the shaft 27 are locked in adjusted position.

An arm 32 is fixed to shaft 27 and projects laterally therefrom having loosely connected with its free end a rod 33. This rod 33 is loosely connected at its other end with the upper end of a lever 34 which is fulcrumed midway its ends on shaft 18. The lower end of the lever 34 has a rod 35 extended transversely therethrough and adapted to slide therein. This rod 35 has an eye 36 at one end and a nut 37 adjustably mounted on its other end. A coil spring 38 is mounted on the rod 35 between the nut 37 and the lever 34 and the tension thereof may be varied by adjusting the nut 37. Another coil spring 39 is connected at one end with the eye 36 of rod 35 and at its other end is attached to shaft 27 preferably by means of a clip 40. A stub shaft 41 projects laterally inward from the upper end of lever 34 and is fixedly mounted in said lever. A grinding wheel 42 is loosely mounted on the stub shaft 41 and has a pinion 43 fixed to one face thereof. This pinion 43 meshes with a gear 44 fixedly secured to the shaft 18 so that when said shaft 18 is rotated the grinding wheel 42 will be correspondingly turned.

The lever 34 being loosely mounted on the shaft 18 may be actuated by the lever 29 for varying the position of the grinding wheel relative to the disks to be sharpened as will be hereinafter more fully described.

Journaled in the side bars 2 and 3 in advance of shaft 18 is a shaft 45 having a crank handle 46 at one end thereof for turning the shaft. Cables 47 and 48 are secured at one end to the shaft 45 and wound in opposite directions thereon, the cable 47 extending forwardly and trained over a pulley 48ª mounted on a shaft 49 secured in the side bars 2 and 3. The other end of the cable 47 is connected with an eye bolt 50 which is adjustably mounted in a bracket 51 carried by a sliding frame 60.

The cable 48 extends rearwardly and is trained around a pulley 52 loosely mounted on a rod or shaft 53 journaled in the rear ends of the side bars 2 and 3. This cable 48 after extending around pulley 52 is connected with an eyebolt 54 carried by a bracket 55 on the sliding frame 60 at the side of the machine opposite to that on which the eye bolt 50 is mounted.

The sliding frame 60 comprises two side members 61 and 62 mounted to slide longitudinally on the side bars 2 and 3. These members 61 and 62 are connected by longitudinally spaced transversely extending cross bars 63 and 64 which carry bearings 65 and 66 to support the disk gang to be sharpened.

The shaft supporting bearings 65 and 66 are exactly alike and hence one only will be described in detail. Each bearing comprises two laterally spaced standards 67 and 68 between which are mounted upper and lower bearing blocks 69 and 70, the block 70 being fixed and block 69 removable and held in place by a bolt 71 extending through apertures 72 in the standards 67 and 68 as is shown clearly in Fig. 6.

These bearings 65 and 66 are designed to support the shank or shaft 100 which carries the harrow disks 101 to be sharpened, it being understood that in order to insert or remove the shaft 100 the upper bearing blocks 69 are removed, the shaft 100 positioned in the lower block 70 and then blocks 69 are inserted between the standards 67 and 68 and secured by the bolts 71. When so positioned the disks 101 are ready to be ground by the wheel 42 it being understood that the covered faces of the disks are sharpened at their peripheries. The disk gang being thus mounted in the sliding frame 60 said frame may be moved forward or backward by turning shaft 45. When the shaft 45 is turned in one direction the cable 47 will be wound up thereon and cable 48 unwound thus exerting a pull on the frame 60 which will move it forward to properly position the disk to be ground in relation to the wheel 42. When the shaft is turned in the opposite direction cable 48 will be wound up thereon and cable 47 unwound thereby exerting a rearward pull on frame 60 to position the gang shaft 100 in the desired relation to the grinder.

A rod 73 is slidably mounted in the extension hub 10 of the bevel gear 11, said rod being polygonal in cross section and the hub correspondingly shaped to receive it so that the rod may slide longitudinally in the hub and held to turn with it so that the rotation of gear 11 will operate to turn rod 73. A pair of clamping jaws 74 and 75 are carried by the inner end of rod 73 and are designed to be engaged with a nut 102 carried by the front end of shaft 100 so that said nut, the shaft 100 and the disks carried thereby will rotate with the rod 73 and will move longitudinally therewith which longitudinal movement occurs when the frame 60 is reciprocated.

In the operation of this machine the parts being in the position shown in Figs. 1 and 2 when power is applied to pulley 20 the shaft 18 will be rotated thereby turning the grinding wheel 42 which has first been properly positioned in relation to the disk to be sharpened by adjusting the lever 29 and locking it engaged with the rack 31. Power is transmitted from pulley 17 through bolt 16 to the pulley 15 the rotation of which operates to turn the stub shaft 13 and through the intermeshing gears 11 and 12 turns rod 73 and also the shaft 100 connected therewith. The beveled gear 12 being made much smaller than gear 11 a slow rotary movement will be imparted to shaft 100 so that the disk 101 will be slowly turned to permit the grinding wheel 42 to properly operate for grinding the disks.

When it is desired to shift the frame 60 to position a new disk to be ground the lever 29 is disengaged from rack 31 and the shaft 27 turned forwardly which causes the crank arm 26 on said shaft to ride over the cam 25 thereby forcing the rod 23 inward against the tension of spring 28 and separating the clutch members 19 and 19ª. This turning of shaft 27 will also lower the grinding wheel out of the path of the disks 101. This separation of the clutch members throws out the gears 11 and 12 and thereby stops the rotation of the disk gang. When the parts are in this position the gang may be removed and another substituted and the sliding frame reciprocated by turning shaft 45 in the desired direction.

When motion is to be imparted to the gang disk the lever 29 is disengaged from the rack 31 and turned rearwardly to move the arm 26 out of engagement with the cam 25 and the spring 28 will then exert its tension against rod 23 to force the clutch members into engagement.

When the lever 29 is released from rack 31 the spring 39 will contract and turn shaft 27 to disengage arm 26 from cam 25.

I claim:

1. In a disk grinding machine, a supporting frame, a grinding wheel mounted for swinging movement in said frame, means for locking said wheel in adjusted position, a disk gang supporting frame mounted to slide on said supporting frame in the path of said wheel to position the disks in contact with said wheel, and means for locking said wheel engaged with said disks.

2. In an apparatus of the class described a supporting frame, a disk gang support mounted to reciprocate on said frame longitudinally thereof, a shaft journaled in said frame and extending transversely thereof, a gear wheel fixed to said shaft, a lever fulcrumed intermediate its ends on said shaft with an arm extending laterally over said gear, a grinding disk loosely mounted on said arm and having a pinion meshing with said gear whereby the turning of the gear rotates the wheel, means connected with said lever for raising and lowering the grinding wheel to position it in relation to the disks to be ground and resilient means to turn said lever to normal position when released.

3. In an apparatus of the class described, a supporting frame, a disk gang support mounted to reciprocate longitudinally on said frame, a transversely extending shaft journaled in said frame, a gear wheel fixed to said shaft, a lever fulcrumed intermediate its ends on said shaft and having a laterally extending arm at one end overlying said gear, a grinding wheel loosely mounted on said arm and having a pinion fixed to one face thereof and meshing with said gear whereby the turning of the gear rotates said wheel, another shaft mounted transversely in said supporting frame and spaced longitudinally from said first mentioned shaft, a link and lever connection between said last mentioned shaft, and the upper end of said lever, a coiled spring connecting the lower end of said lever with said last mentioned shaft and means for turning said last mentioned shaft to swing said lever into horizontal position against the tension of said spring for lowering the grinding wheel to provide for the adjustment of the disk gang relatively thereto.

4. In a disk grinding machine, a supporting frame, a grinding wheel mounted for swinging movement in said frame, means for adjusting and locking said wheel in adjusted position, a disk gang supporting frame mounted to reciprocate on said supporting frame to position the disks in the path of the grinding wheel, and a rotary member connected with said gang supporting frame whereby the turning of said member in one direction will move the frame in one direction and the reverse movement of said member will move the frame in the other direction.

5. In a disk grinding machine, a supporting frame, a transverse shaft mounted to rotate in said frame, a grinding disk connected to be rotated by said shaft, a disk gang support mounted on said frame, a rod rotatably mounted on said frame and having means for engaging a disk gang for rotating it, a pulley loosely mounted on said shaft and carrying a clutch element, a driving wheel fixed to said shaft and having a clutch element to cooperate with the pulley carried element for connecting the pulley with the shaft to adapt it to be rotated thereby, means connecting said pulley to rotate said rod, and means for sliding the pulley on the shaft to release the clutch and throw out the rod actuating means.

6. In a disk grinding machine, a supporting frame, a transverse shaft mounted to rotate in said frame with one end extending beyond the frame, a drive pulley fixed to said end and having a clutch member on its inner face, a pulley loosely mounted on said end and having a clutch member for engagement with the first mentioned clutch member, a grooved extension hub on the inner face of said second mentioned pulley, a rod having one end engaged with said grooved hub extension and its other end pivotally mounted on said frame to permit the rod to swing laterally, a cam carried by said rod, a grinding wheel carried by said shaft, a disk support mounted on said frame, a pulley connected to actuate the disks carried by said disk support, a band connecting said second mentioned pulley with said last mentioned pulley, and oscillatable means operable to engage said cam and swing said rod inwardly to release the clutch members and throw out the disk rotating means.

7. A disk grinding machine including a supporting frame, a transverse shaft rotatable therein, a lever fulcrumed intermediate its ends on said shaft and having a grinding disk carried by one end, another shaft mounted transversely in said frame and having means for rotating it, a connection between said shaft and lever whereby the turning of the shaft will swing the lever to raise or lower the grinding disk, a clutch carrying pulley loosely mounted on said first mentioned shaft, a rod connected at one end with said pulley and pivoted at its other end to said frame, a spring normally forcing said rod outward, a cam on said rod, an arm carried by said second mentioned shaft to engage said cam when the shaft is turned in one direction to move said rod upward against the tension of its spring, and means to return said arm to initial position when the shaft is released.

In testimony that I claim the foregoing as my own, I have hereto affixed my signature.

HANS F. HANSON.